(12) United States Patent
Hua et al.

(10) Patent No.: US 8,300,677 B2
(45) Date of Patent: Oct. 30, 2012

(54) SIGNAL DETECTING METHOD AND DEVICE FOR MULTI-CODEWORD MIMO SYSTEM

(75) Inventors: Meng Hua, Shenzhen (CN); Gengshi Wu, Shenzhen (CN); Chunling Zhang, Shenzhen (CN); Shurong Jiao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 12 days.

(21) Appl. No.: 12/981,878

(22) Filed: Dec. 30, 2010

(65) Prior Publication Data

US 2011/0142117 A1 Jun. 16, 2011

Related U.S. Application Data

(63) Continuation of application No. PCT/CN2009/071298, filed on Apr. 16, 2009.

(51) Int. Cl.
*H04B 1/00* (2006.01)
(52) U.S. Cl. .......................... 375/148; 375/346; 375/349
(58) Field of Classification Search .................. 375/141, 375/147, 148, 260, 267, 285, 324, 340, 346, 375/347, 349; 455/501, 63.1, 67.11, 67.13, 455/226.1–226.4; 370/464–467, 478–480
See application file for complete search history.

(56) References Cited

U.S. PATENT DOCUMENTS

| | | | | |
|---|---|---|---|---|
| 7,489,746 B1 * | 2/2009 | Awater et al. | .................. | 375/341 |
| 7,571,203 B2 * | 8/2009 | Jeon et al. | ...................... | 708/520 |
| 7,616,699 B2 * | 11/2009 | Niu et al. | ...................... | 375/267 |
| 7,920,657 B2 * | 4/2011 | Kim et al. | ...................... | 375/341 |
| 7,974,334 B2 * | 7/2011 | Waters et al. | ................. | 375/229 |
| 2005/0276361 A1 | 12/2005 | Kim et al. | | |
| 2007/0174038 A1 | 7/2007 | Wang et al. | | |
| 2008/0043864 A1 | 2/2008 | Fujii | | |

FOREIGN PATENT DOCUMENTS

| | | |
|---|---|---|
| CN | 1355626 | 6/2002 |
| CN | 101102295 | 1/2008 |
| CN | 2008-48219 | 2/2008 |
| CN | 101330361 | 12/2008 |

OTHER PUBLICATIONS

Written Opinion of the International Searching Authority mailed Jul. 23, 2009 in corresponding International Patent Application PCT/CN2009/071298.
European Search Report dated Nov. 18, 2011 issued in corresponding European Patent Application No. 09799947.8.

* cited by examiner

*Primary Examiner* — Dac Ha
(74) *Attorney, Agent, or Firm* — Staas & Halsey LLP

(57) ABSTRACT

A signal detecting method and device for a multi-codeword multi-input multi-output (MIMO) system are provided, which are used in the field of communication and solve the problem that it is complex to implement a signal detecting method in the multi-codeword MIMO system and the error between the signal obtained through detection and the signal actually transmitted from the transmitting end is large. The method includes: converting a received complex number signal into a real number signal; performing channel estimation to obtain a channel matrix; correcting the channel matrix to obtain an equivalent corrected matrix; generating an equivalent detecting signal according to the equivalent corrected matrix and the real number signal obtained through conversion; quantizing the equivalent detecting signal to obtain an equivalent quantized detecting signal; and generating a signal transmitted from a transmitting end according to the equivalent quantized detecting signal. The method and device can be applied in a receiving device of a multi-codeword MIMO system.

9 Claims, 8 Drawing Sheets

US 8,300,677 B2

SIGNAL DETECTING METHOD AND DEVICE FOR MULTI-CODEWORD MIMO SYSTEM

CROSS-REFERENCE TO RELATED APPLICATIONS

This application is a continuation of International Application No. PCT/CN2009/071298, filed on Apr. 16, 2009, which claims priority to Chinese Patent Application No. 200810134429.4, filed on Jul. 23, 2008, both of which are hereby incorporated by reference in their entireties.

FIELD OF THE INVENTION

The present invention relates to the field of communication, and in particular, to a signal detecting method and device for a multi-codeword multi-input multi-output (MIMO) system.

BACKGROUND OF THE INVENTION

A plurality of antennas is installed in a transmitting end and a receiving end of a MIMO system. During signal transmission, the transmitting end transmits a plurality of independent signals through different transmitting antennas by using space division multiplexing technology, and the receiving end receives the signals from different receiving antennas and obtains the signal transmitted from the transmitting end from the received signals.

In the MIMO system, the transmitting end may use a mono-codeword or multi-codeword space division multiplexing manner to transmit signals. In the mono-codeword manner, multiple antenna signals transmitted from the transmitting end are code-modulated using the same code modulation manner; and in the multi-codeword manner, the multiple antenna signals transmitted from the transmitting end are code-modulated using two or more code modulation manners.

In the prior art, a receiving end of a multi-codeword MIMO system detects the signal transmitted from the transmitting end from the received signals mainly through three methods: Maximum Likelihood (ML), Zero-Forcing (ZF) and Minimum Mean-Squared Error (MMSE).

The detecting principle of the ML detecting method is as follows: a channel matrix is estimated, and a probably received signal vector is obtained according to the estimated channel matrix and the known signal vector probably transmitted from the transmitting end; and an actually received signal vector is compared with the probably received signal vector, a signal which is closest to the signal in the probably received signal vector is obtained from the actually received signal vector, and the signal is used as the detected signal transmitted from the transmitting end.

The error between the signal detected through the ML detecting method and the signal transmitted from the transmitting end is small. However, in the implementation of the present invention, the inventor finds that the number of calculations of the ML detecting method is large when the number of the transmitting antennas and the receiving antennas is large, thus causing complex implementation of the ML detecting method.

The detecting principle of the ZF detecting method is as follows: a channel equalization matrix is obtained according to a channel matrix, in which the product of the channel equalization matrix and the channel matrix is a unit matrix; and a signal transmitted from the transmitting end is generated according to the channel equalization matrix and an actually received signal matrix.

Compared with the ML detecting method, the ZF detecting method requires a smaller number of calculations and is easier to implement. However, in the implementation of the present invention, the inventor finds that, the ZF detecting method causes an increase of the noise power in the process of calculating the channel equalization matrix, and especially when the channel quality is poor (severely ill-conditioned channel matrix), the noise has an obvious effect on the quality of the detected signal, thus resulting in a large error between the signal transmitted from the transmitting end that is obtained through the ZF detecting method and the signal actually transmitted from the transmitting end.

The detecting principle of the MMSE detecting method is basically the same as the detecting principle of the ZF detecting method, and the difference lies in that when a channel equalization matrix is calculated through the MMSE detecting method, the estimation of the channel noise power is added, and the effect of noise and interference is taken into consideration.

Since the MMSE detecting method takes the effect of the noise into consideration, the quality of the signal obtained through the MMSE detecting method is better than the signal obtained through the ZF detecting method. However, in the implementation of the present invention, the inventor finds that, compared with the signal obtained through the ML detecting method, the signal obtained through the MMSE detecting method still has a large error from the signal actually transmitted from the transmitting end, and the error is obvious when the channel quality is poor (severely ill-conditioned channel matrix).

SUMMARY OF THE INVENTION

Accordingly, embodiments of the present invention is directed to a signal detecting method and device for a multi-codeword MIMO system, which is easy to implement, and can reduce the error between the signal obtained through detection and the signal actually transmitted from the transmitting end.

In order to achieve above objectives, one aspect of the present invention provides a signal detecting method for a multi-codeword MIMO system, which includes: converting a received complex number signal into a real number signal; performing channel estimation to obtain a channel matrix; correcting the channel matrix to obtain an equivalent corrected matrix; generating an equivalent detecting signal according to the equivalent corrected matrix and the real number signal obtained through conversion; quantizing the equivalent detecting signal to obtain an equivalent quantized detecting signal; and generating a signal transmitted from a transmitting end according to the equivalent quantized detecting signal.

Another aspect of the present invention provides a signal detecting device for a multi-codeword MIMO system, which includes:

a signal converting unit, adapted to convert a received complex number signal into a real number signal;

a channel estimating unit, adapted to perform channel estimation to obtain a channel matrix;

a channel matrix correcting unit, adapted to correct the channel matrix obtained by the channel estimating unit to obtain an equivalent corrected matrix;

an equivalent detecting signal generating unit, adapted to generate an equivalent detecting signal according to the equivalent corrected matrix obtained by the channel matrix correcting unit and the real number signal generated by the signal converting unit;

an equivalent detecting signal quantizing unit, adapted to quantize the equivalent detecting signal generated by the equivalent detecting signal generating unit to obtain an equivalent quantized detecting signal; and a signal-transmitted-from-transmitting-end generating unit, adapted to generate a signal transmitted from a transmitting end according to the equivalent quantized detecting signal obtained by the equivalent detecting signal quantizing unit.

Through the signal detecting method and device for a multi-codeword MIMO system according to the embodiments of the present invention, since the channel matrix is corrected, the problem in the prior art that the noise has a great effect on the signal detected by the receiving end of the multi-codeword MIMO system due to poor channel quality (severely ill-conditioned channel matrix) is solved; since the equivalent detecting signal obtained through detection is quantized, the quality of the equivalent detecting signal after quantization is improved, so that the error between the signal transmitted from the transmitting end that is generated according to the equivalent quantized detecting signal obtained after quantization and the signal actually transmitted from the transmitting end is reduced, thereby solving the problem in the prior art that the error between the detecting signal obtained through detection and the signal actually transmitted from the transmitting end is large. Further, the technical solutions of the present invention are easy to implement.

DETAILED DESCRIPTION OF THE DRAWINGS

Figure 9:
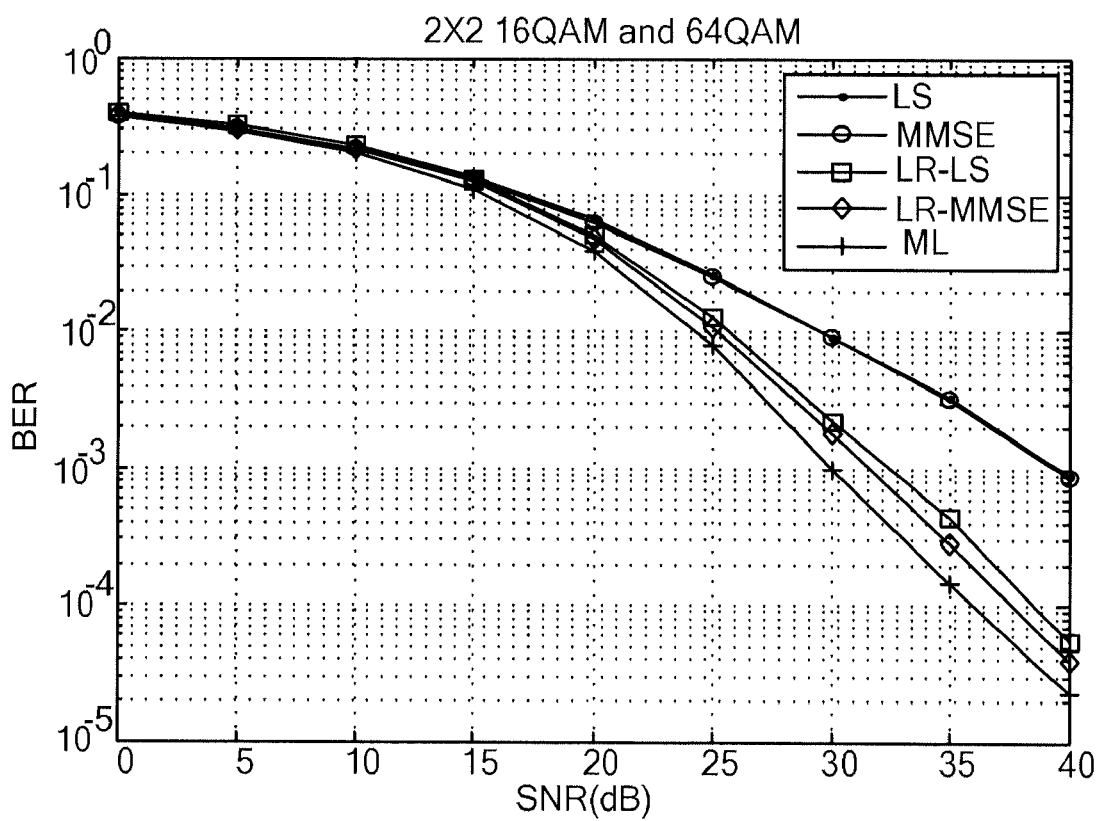
Figure 10:
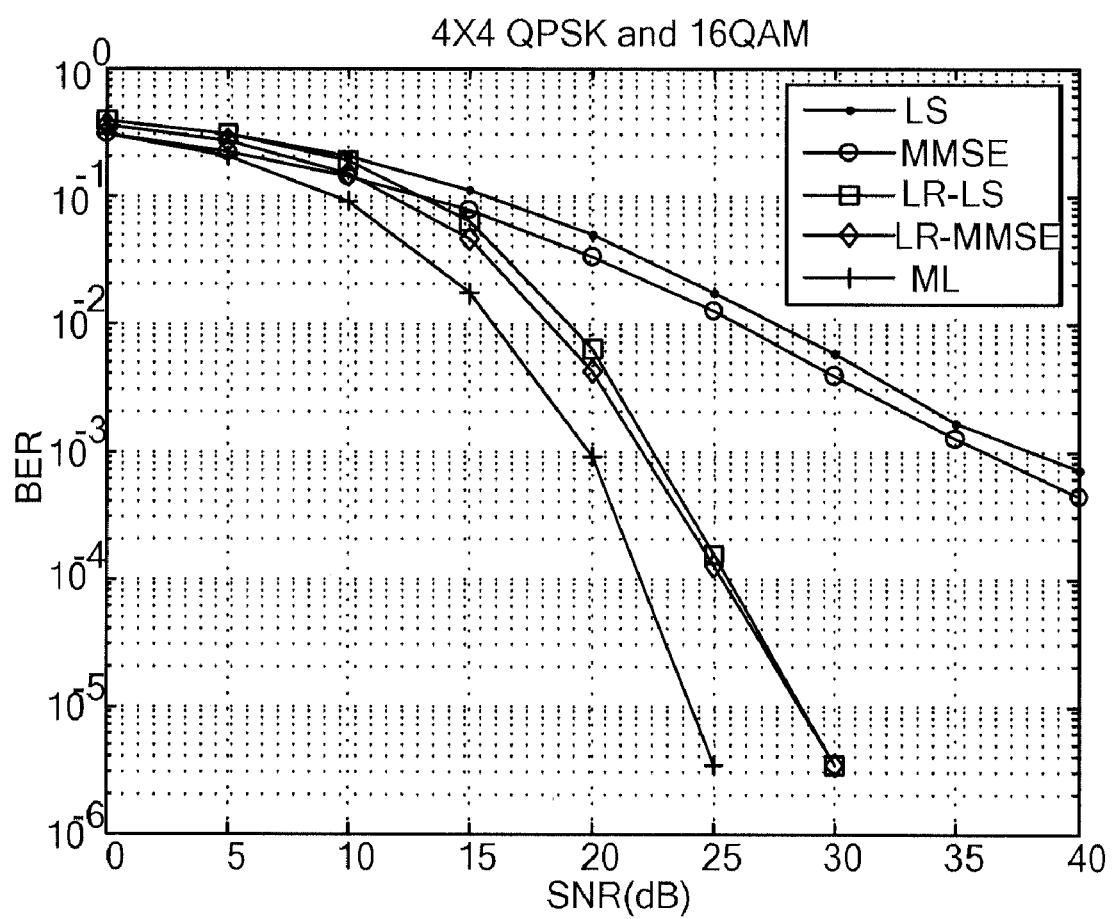

FIG. 9 is a schematic view of BERs of a signal detecting method and device for a multi-codeword MIMO system according to an embodiment of the present invention and detecting algorithms in the prior art when the two codewords are 16QAM and 64QAM respectively in a 2×2 multi-codeword MIMO system; and FIG. 10 is a schematic view of BERs of a signal detecting method and device for a multi-codeword MIMO system according to an embodiment of the present invention and detecting algorithms in the prior art when the two codewords are QPSK and 16QAM respectively in a 4×4 multi-codeword MIMO system.

DETAILED DESCRIPTION OF THE EMBODIMENTS

In order to solve the problem that it is complex to implement a signal detecting method for a multi-codeword MIMO system and the error between the signal obtained through detection and the signal actually transmitted from the transmitting end is large, the present invention provides a signal detecting method and device for a multi-codeword MIMO system.

Figure 1:
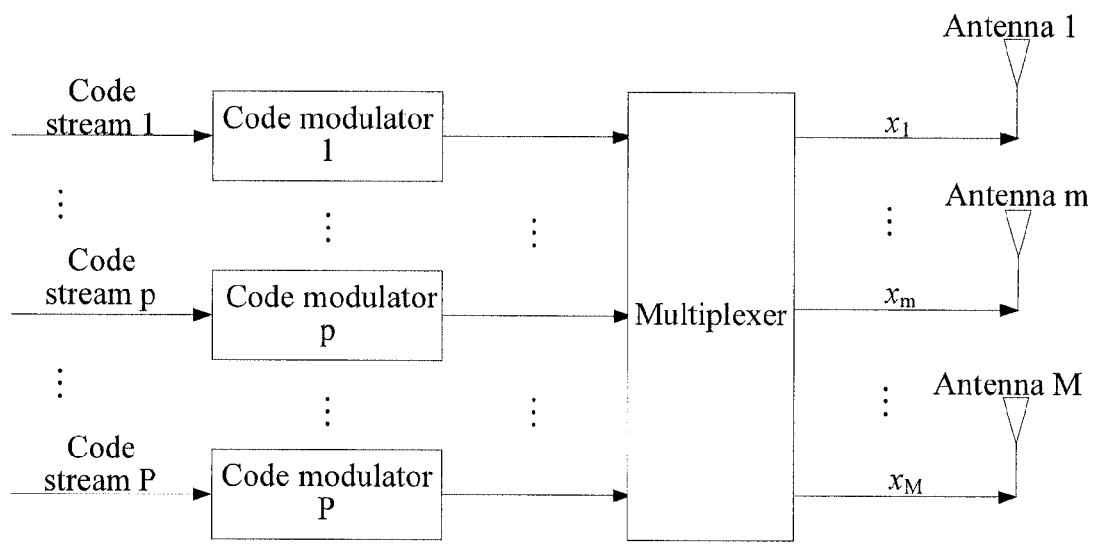
FIG. 1 is a block diagram of a transmitting end of a multi-codeword MIMO system according to an embodiment of the present invention.

As shown in FIG. 1, a transmitting end of a multi-codeword MIMO system according to an embodiment of the present invention includes M transmitting antennas, in which, the complex number modulation signal transmitted on the mth transmitting antenna is $x_m$, and the complex number modulation signals transmitted on the M transmitting antennas are $X_C = [x_1, x_2, \ldots, x_m]^T$. In this embodiment, the transmitting end of the multi-codeword MIMO system can transmit p code streams and use p modulation manners to perform modulation. When the pth modulation manner is $2^{Q_p}$-QAM, a set composed by a constellation point symbol of the pth modulation manner is:

$$A_{pC} = \{a_{pC} \mid R(a_{pC}), I(a_{pC})\alpha_p s + \beta_p \text{ and } s = 0, 1, \ldots, 2^{\frac{Q_p}{2}} - 1\}, \quad (1)$$

in which, $$\alpha_p = \sqrt{\frac{6}{2^{Q_p} - 1}},$$

$$\beta_p = -\frac{\alpha_p}{2}\left(2^{\frac{Q_p}{2}} - 1\right),$$

and $R(\bullet)$ and $I(\bullet)$ represent operations of taking a real part and an imaginary part.

In this embodiment, when the complex number modulation signal $x_m$ transmitted on the mth antenna is modulated using the pth modulation manner, $x_m \in A_{pC}$.

Figure 2:
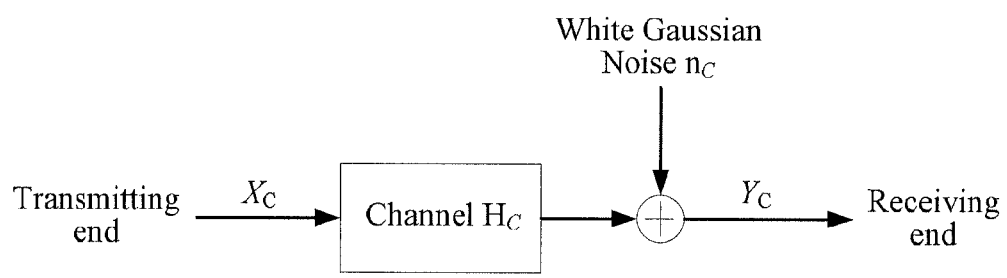
FIG. 2 is a block diagram of a channel modeling of a multi-codeword MIMO system according to an embodiment of the present invention.

The transmitting end and the receiving end of the multi-codeword MIMO system communicate with each other through a channel as shown in FIG. 2, in which, the channel is a narrowband channel. When the number of receiving antennas of the receiving end is N, and the number M of the transmitting antennas is smaller than the number N of the receiving antennas, the complex number signal $Y_C = [y_1, y_2, \ldots, y_N]^T$ received by the receiving end may be obtained through the following formula (2):

$$Y_C = H_C X_C + n_C \quad (2),$$

in which, $H_C \in C^{N \times M}$ is a complex number MIMO channel matrix, and $n_C \in C^{N \times 1}$ is a complex number noise signal which is an independent complex Gaussian random variable whose mean is zero and variance is $\sigma^2$.

Figure 3:
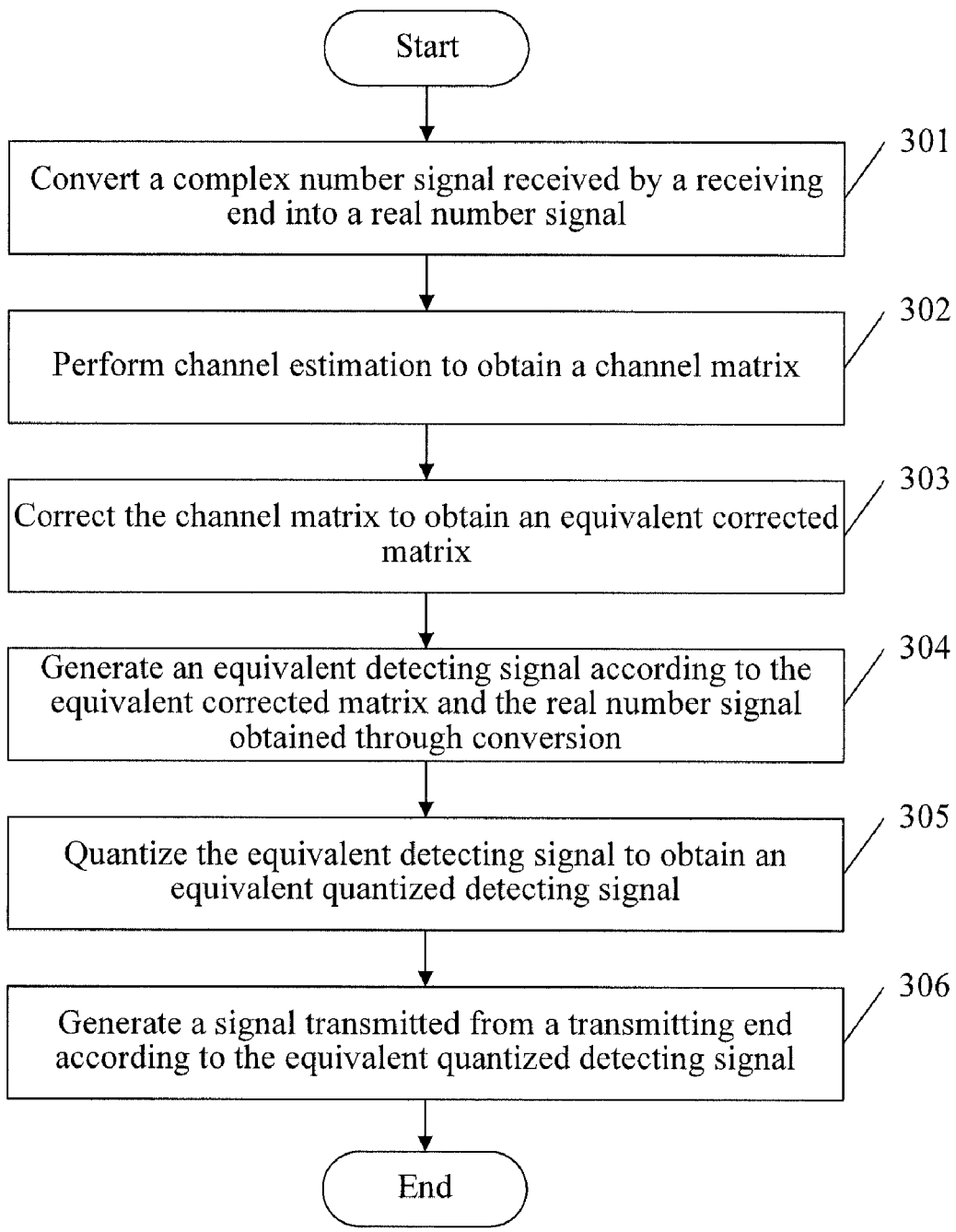
FIG. 3 is a flow chart of a signal detecting method for a multi-codeword MIMO system according to an embodiment of the present invention.

As shown in FIG. 3, in the multi-codeword MIMO system, the receiving end detects the received signal by using a signal detecting method for a multi-codeword MIMO system according to an embodiment of the present invention, which includes the following blocks.

In Block 301, a complex number signal received by the receiving end is converted into a real number signal.

In this embodiment, by separating the real part and the imaginary part of the received complex number signal $Y_C$ in the Block 301, the complex number signal $Y_C$ is converted into a real number signal Y.

After the complex number signal $Y_C$ is converted into the real number signal Y, a channel model function may be shown by the following formula (3):

$$Y = HX + n, \quad (3)$$

in which, $$Y = \begin{bmatrix} R(Y_C) \\ I(Y_C) \end{bmatrix},$$

$$X = \begin{bmatrix} R(X_C) \\ I(X_C) \end{bmatrix},$$

$$n = \begin{bmatrix} R(n_C) \\ I(n_C) \end{bmatrix},$$

$$H = \begin{bmatrix} R(H_C) & -I(H_C) \\ I(H_C) & R(H_C) \end{bmatrix}.$$

In the formula (3), when the complex number modulation signal $x_m$ transmitted on the mth antenna of the transmitting end is modulated using the pth modulation manner, $R(x_m)$, $I(x_m) \in A_p$, and at this time, $A_p$ may be shown by the following formula (4):

$$A_p = \{v_p \mid v_p = \alpha_p s_p + \beta_p \text{ and } s_p = 0, 1, \ldots, 2^{\frac{Q_p}{2}} - 1\}, \quad (4)$$

in which, $$\alpha_p = \sqrt{\frac{6}{2^{Q_p} - 1}},$$

$$\beta_p = -\frac{\alpha_p}{2}\left(2^{\frac{Q_p}{2}} - 1\right).$$

In the formula (3), the element contained in the n is an independent real Gaussian random variable whose mean is zero and variance is $\sigma^2/2$.

In Block 302, channel estimation is performed to obtain a channel matrix H.

In Block 303, the channel matrix H is corrected to obtain an equivalent corrected matrix $\overline{H}$.

Figure 4:
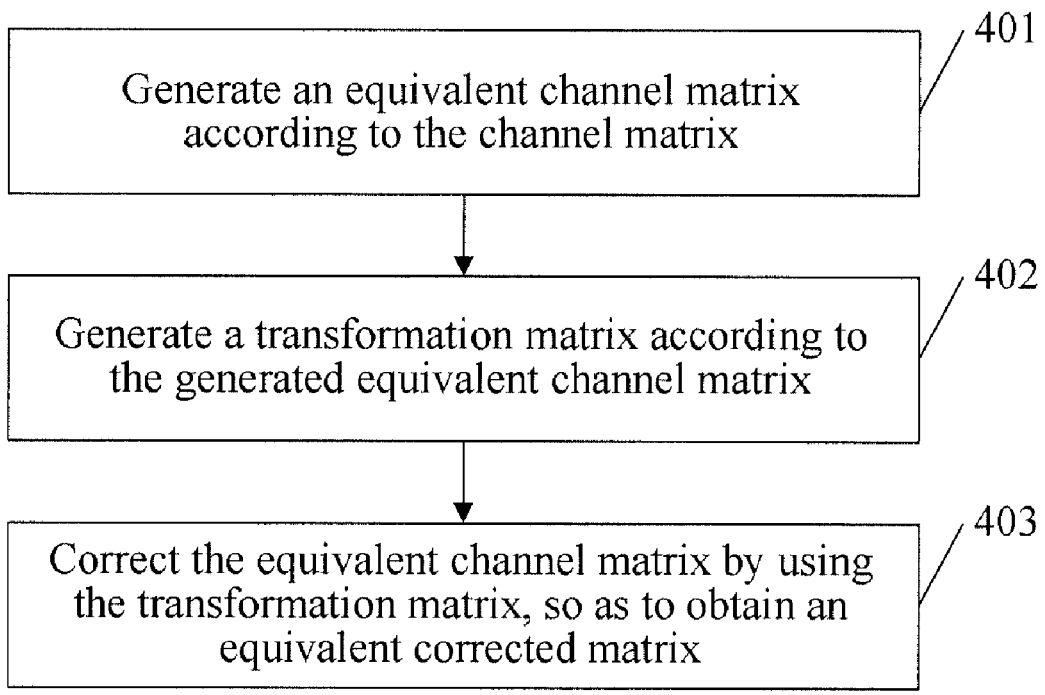
FIG. 4 is a flow chart of Block 303 of the signal detecting method for a multi-codeword MIMO system according to the embodiment of the present invention shown in FIG. 3.

In this embodiment, the channel matrix H is corrected through a lattice reduction (LR) algorithm in the Block 303. As shown in FIG. 4, the following blocks are included.

In Block 401, an equivalent channel matrix $H_0$ is generated according to the channel matrix H, which includes the following steps.

Firstly, the formula (3) is transformed to obtain a formula (5):

$$Y = H(As + b) + n \quad (5),$$

in which, A is a 2M×2M diagonal matrix whose diagonal element is $\text{diag}(A) = [a_1, a_2, \ldots, a_M, a_1, a_2, \ldots, a_M]$, and when the signal $x_m$ transmitted on the mth antenna of the transmitting end is modulated using the pth modulation manner $2^{Q_p}$-QAM, $a_m = \alpha_p$, and $$\alpha_p = \sqrt{\frac{6}{2^{Q_p} - 1}};$$

b is a 2M×1 matrix, $b = [b_1, b_2, \ldots, b_M, b_1, b_2, \ldots, b_M]^T$, and when the signal $x_m$ transmitted on the mth antenna of the transmitting end is modulated using the pth modulation manner $2^{Q_p}$-QAM, $b_m = \beta_p$, and $$\beta_p = -\frac{\alpha_p}{2}\left(2^{\frac{Q_p}{2}} - 1\right);$$

s is a 2M×1 matrix consisting of integer elements, $s = [s_1, s_2, \ldots, s_M, s_1, s_2, \ldots, s_M]^T$, and when the signal $x_m$ transmitted on the mth antenna of the transmitting end is modulated using the pth modulation manner $2^{Q_p}$-QAM, $$s_m \in \{0, 1, \ldots, 2^{\frac{Q_p}{2}} - 1\}.$$

Then, A is extracted from the formula (5), so as to obtain an equivalent channel matrix $H_0 = HA$, and at this time, the formula (5) may be transformed into:

$$Y = HA(s + A^{-1}b) + n \quad (6).$$

If $t = s + A^{-1}b$, the formula (6) is transformed into:

$$Y = H_0 t + n \quad (7),$$

in which, when the signal $x_m$ transmitted on the mth antenna of the transmitting end is modulated using the pth modulation manner $2^{Q_p}$-QAM, $t \in A_p$, and at this time, $$A_p = \left\{v_p \mid v_p = s_p + \frac{\beta_p}{\alpha_p} \text{ and } s_p = 0, 1, \ldots, 2^{\frac{Q_p}{2}} - 1\right\}.$$

In Block 402, a transformation matrix T is generated according to the generated equivalent channel matrix $H_0$.

In this embodiment, the transformation matrix T is generated according to the equivalent channel matrix $H_0$ through an LLL (Lenstra-Lenstra-Lovász) algorithm in the Block 402.

In Block 403, the equivalent channel matrix $H_0$ is corrected by using the transformation matrix T, so as to obtain an equivalent corrected matrix $\overline{H}$.

In this embodiment, if the obtained equivalent corrected matrix $\overline{H} = H_0 T$, the formula (7) is transformed into:

$$Y = \overline{H}T^{-1}t + n \quad (8).$$

At this time, if $z = T^{-1}t$ is used as an equivalent detecting signal, the formula (8) is transformed into:

$$Y = \overline{H}z + n \quad (9).$$

In Block 304, an equivalent detecting signal z is generated according to the equivalent corrected matrix $\overline{H}$ and the real number signal Y obtained through conversion.

In this embodiment, the equivalent detecting signal z may be generated through two methods in the Block 304: one method is that the equivalent detecting signal z is generated by using a ZF algorithm; the other method is that the equivalent detecting signal z is generated by using an MMSE algorithm. The above two methods are described respectively in detail in the following.

First method: the equivalent detecting signal z is generated by using a ZF algorithm.

Figure 5:
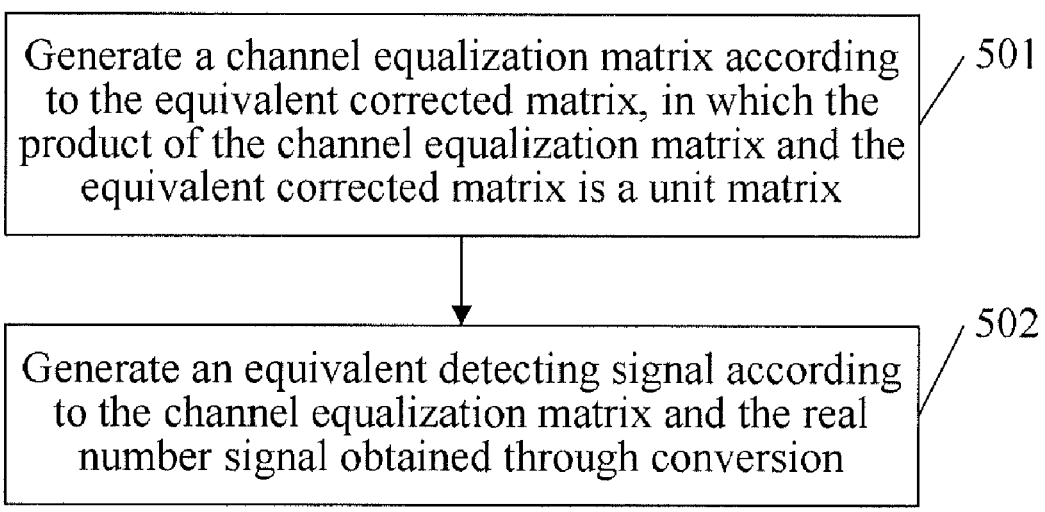
FIG. 5 is a flow chart of implementation of Block 304 of the signal detecting method for a multi-codeword MIMO system according to the embodiment of the present invention shown in FIG. 3 by using a first method.

As shown in FIG. 5, the method may include the following blocks.

In Block 501, a channel equalization matrix $\overline{G}$ is generated according to the equivalent corrected matrix $\overline{H}$, in which the product of the channel equalization matrix $\overline{G}$ and the equivalent corrected matrix $\overline{H}$ is a unit matrix I, and in this embodiment, $\overline{G} = (\overline{H}^T \overline{H})^{-1} \overline{H}^T$.

In Block 502, an equivalent detecting signal z is generated according to the channel equalization matrix $\overline{G}$ and the real number signal Y obtained through conversion.

In this method, the equivalent detecting signal z is generated through the following formula (10) in the Block 502:

$$z = \overline{G}Y = (\overline{H}^T \overline{H})^{-1} \overline{H}^T Y. \tag{10}$$

Second method: the equivalent detecting signal z is generated by using an MMSE algorithm.

The steps of this method are basically the same as the first method, and the difference lies in that when this method is used, a noise power signal $\sigma_n^2$ and the power of the real number signal Y obtained in the Block 301 $\sigma_n^2$ need to be obtained, and at this time, a channel equalization matrix $\overline{G}$ is generated according to the equivalent corrected matrix $\overline{H}$, the noise power signal $\sigma_n^2$, and the power $\sigma_x^2$ of the real number signal Y. In this embodiment, $$\overline{G} = \left( \overline{H}^T \overline{H} + \frac{\sigma_n^2}{\sigma_s^2} I_{2N \times 2N} \right)^{-1} \overline{H}^T,$$

and $$\overline{G} = T^{-1} H_0^T \left( H_0 H_0^T + \frac{\sigma_n^2}{\sigma_x^2} I_{2M \times 2M} \right)^{-1}$$

is obtained by substituting $\overline{H} = H_0 T$.

In this method, an equivalent detecting signal z may be generated through the following formula (11):

$$z = \overline{G}Y = T^{-1} H_0^T \left( H_0 H_0^T + \frac{\sigma_n^2}{\sigma_x^2} I_{2M \times 2M} \right)^{-1} Y. \tag{11}$$

In Block 305, the equivalent detecting signal z is quantized to obtain an equivalent quantized detecting signal $\overline{z}$.

In this embodiment, because $z = T^{-1}t$, and $t = s + A^{-1}b$, the following formula (12) is obtained:

$$Z = T^{-1}(s + A^{-1}b) = T^{-1}s + T^{-1}A^{-1}b. \tag{12}$$

T and s are integers, so $T^{-1}s$ is also an integer. The following formula (13) may be obtained according to the formula (12):

$$T^{-1}s = \langle z - T^{-1}A^{-1}b \rangle \tag{13},$$

in which, $\langle \rangle$ represents the operation of taking the nearest integer.

The equivalent detecting signal z generated in the Block 304 is quantized according to the formula (13), and then an equivalent quantized detecting signal $\overline{z} = \langle z - T^{-1}A^{-1}b \rangle + T^{-1}A^{-1}b$ may be obtained.

In Block 306, a signal X transmitted from the transmitting end is generated according to the equivalent quantized detecting signal $\overline{z}$.

In this embodiment, because $\overline{H} = H_0 T$ and $H_0 = HA$, the following formula (14) is obtained according to the formula (9):

$$Y = HAT z + n \tag{14}.$$

Since it may be known according to the formula (3) that Y=HX+n, X=ATz. Thus, in the Block 306, by substituting the equivalent quantized detecting signal $\overline{z}$ obtained in the Block 305 into the above formula, a signal X transmitted from the transmitting end is generated, and $X = AT\overline{z}$.

Through the signal detecting method for a multi-codeword MIMO system according to the embodiment of the present invention, since the channel matrix is corrected, the problem in the prior art that the noise has a great effect on the signal detected by the receiving end of the multi-codeword MIMO system due to poor channel quality (severely ill-conditioned channel matrix) is solved; since the equivalent detecting signal obtained through detection is quantized, the quality of the equivalent detecting signal after quantization is improved, so that the error between the signal transmitted from the transmitting end that is generated according to the equivalent quantized detecting signal obtained after quantization and the signal actually transmitted from the transmitting end is reduced, thereby solving the problem in the prior art that the error between the detecting signal obtained through detection and the signal actually transmitted from the transmitting end is large. Further, the technical solution of the present invention is easy to implement.

Figure 6:
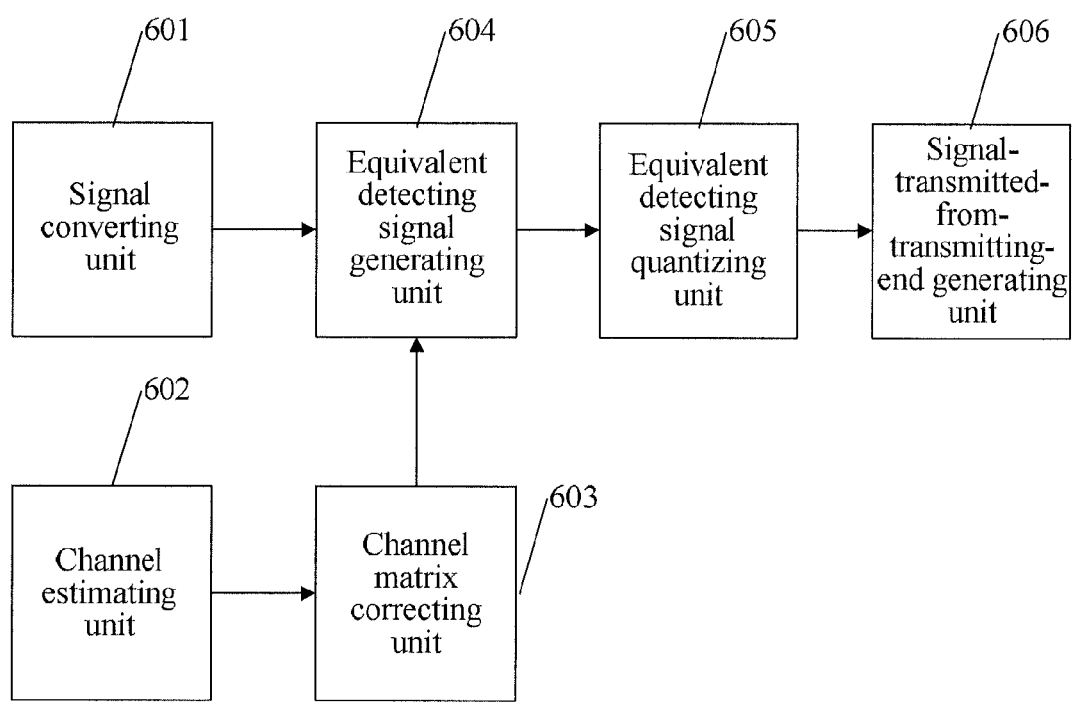
FIG. 6 is a first schematic structural view of a signal detecting device for a multi-codeword MIMO system according to an embodiment of the present invention.

Corresponding to the above method, as shown in FIG. 6, an embodiment of the present invention further provides a signal detecting device for a multi-codeword MIMO system, which includes:

a signal converting unit 601, adapted to convert a received complex number signal into a real number signal;

a channel estimating unit 602, adapted to perform channel estimation to obtain a channel matrix;

a channel matrix correcting unit 603, adapted to correct the channel matrix obtained by the channel estimating unit 602 to obtain an equivalent corrected matrix;

an equivalent detecting signal generating unit 604, adapted to generate an equivalent detecting signal according to the equivalent corrected matrix obtained by the channel matrix correcting unit 603 and the real number signal generated by the signal converting unit 601;

an equivalent detecting signal quantizing unit 605, adapted to quantize the equivalent detecting signal generated by the equivalent detecting signal generating unit 604 to obtain an equivalent quantized detecting signal; and a signal-transmitted-from-transmitting-end generating unit 606, adapted to generate a signal transmitted from a transmitting end according to the equivalent quantized detecting signal obtained by the equivalent detecting signal quantizing unit 605.

Figure 7:
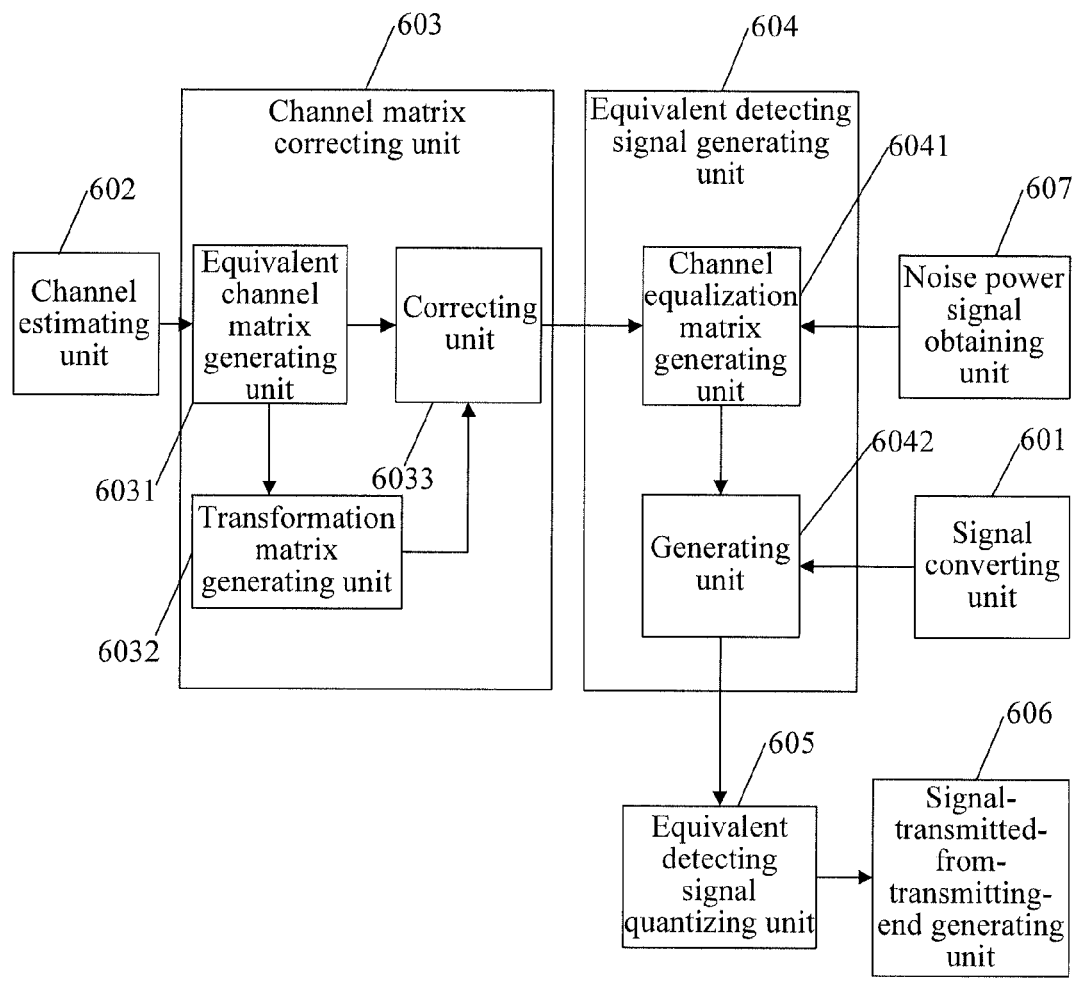
FIG. 7 is a second schematic structural view of a signal detecting device for a multi-codeword MIMO system according to an embodiment of the present invention.

Further, as shown in FIG. 7, the channel matrix correcting unit 603 may include:

an equivalent channel matrix generating unit 6031, adapted to generate an equivalent channel matrix according to the channel matrix obtained by the channel estimating unit 602;

a transformation matrix generating unit 6032, adapted to generate a transformation matrix according to the equivalent channel matrix obtained by the equivalent channel matrix generating unit 6031; and a correcting unit 6033, adapted to correct the equivalent channel matrix generated by the equivalent channel matrix generating unit 6031 by using the transformation matrix generated by the transformation matrix generating unit 6032, so as to obtain an equivalent corrected matrix.

Further, as shown in FIG. 7, the equivalent detecting signal generating unit 604 may include:

a channel equalization matrix generating unit 6041, adapted to generate a channel equalization matrix according to the equivalent corrected matrix obtained by the channel matrix correcting unit 603, in which, the product of the channel equalization matrix and the equivalent corrected matrix is a unit matrix; and a generating unit 6042, adapted to generate an equivalent detecting signal according to the channel equalization matrix generated by the channel equalization matrix generating unit 6041 and the real number signal obtained by the signal converting unit 601, Further, as shown in FIG. 7, the signal detecting device for a multi-codeword MIMO system according to the embodiment of the present invention may further include:

a noise power signal obtaining unit 607, adapted to obtain a noise power signal; in which the channel equalization matrix generating unit 6041 is a second channel equalization matrix generating unit, adapted to generate a channel equalization matrix according to the equivalent corrected matrix obtained by the channel matrix correcting unit 603 and the noise power signal obtained by the noise power signal obtaining unit 607.

The signal detecting device for a multi-codeword MIMO system according to the embodiment of the present invention may be used in a signal receiving device of a multi-codeword MIMO system.

Through the signal detecting device for a multi-codeword MIMO system according to the embodiment of the present invention, since the channel matrix is corrected, the problem in the prior art that the noise has a great effect on the signal detected by the receiving end of the multi-codeword MIMO system due to poor channel quality (severely ill-conditioned channel matrix) is solved; since the equivalent detecting signal obtained through detection is quantized, the quality of the equivalent detecting signal after quantization is improved, so that the error between the signal transmitted from the transmitting end that is generated according to the equivalent quantized detecting signal obtained after quantization and the signal actually transmitted from the transmitting end is reduced, thereby solving the problem in the prior art that the error between the detecting signal obtained through detection and the signal actually transmitted from the transmitting end is large. Further, the technical solution of the present invention is easy to implement.

Figure 8:
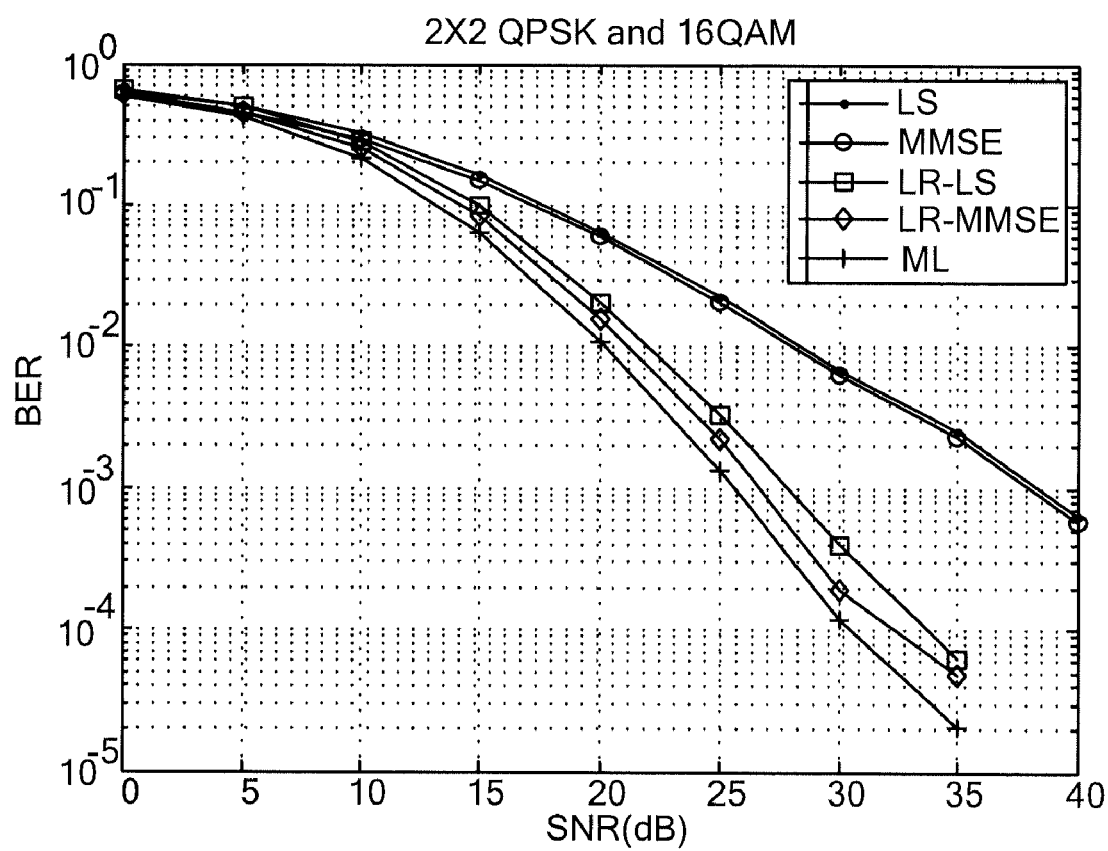
FIG. 8 is a schematic view of bit error rates (BERs) of a signal detecting method and device for a multi-codeword MIMO system according to an embodiment of the present invention and detecting algorithms in the prior art when the two codewords are QPSK and 16QAM respectively in a 2×2 multi-codeword MIMO system.

In order to enable persons skilled in the art to have a clear understanding of the beneficial effects of the signal detecting method and device for a multi-codeword MIMO system according to the embodiments of the present invention, FIG. 8, FIG. 9 and FIG. 10 respectively show the BER performance of the detecting signals obtained through the technical solutions of the present invention and the ML, ZF and MMSE algorithms provided by the prior art. It can be known through FIG. 8, FIG. 9 and FIG. 10 that, compared with the ZF algorithm and MMSE algorithm in the prior art, the technical solutions of the present invention reduce the error between the detecting signal obtained through detection and the signal transmitted from the transmitting end.

The complexity of the ML algorithm in the prior art is relevant to the parameters such as the number M of the transmitting antennas, the number N of the receiving antennas and the modulation manner $2^{Q_m}$-QAM used by the mth antenna. The ML algorithm mainly focuses on obtaining a probably received signal matrix and comparing an actually received signal matrix with the probably received signal matrix. When a probably received signal matrix is obtained, real number multiplication is performed $4MN(Q_1Q_2 \ldots Q_M)^2$ times and real number addition is performed $2N(2M-1)(Q_1Q_2 \ldots Q_M)^2$ times, and when an actually received signal matrix is compared with the probably received signal matrix, real number multiplication is performed $2N(Q_1Q_2 \ldots Q_M)^2$ times and real number addition is performed $(4N-1)(Q_1Q_2 \ldots Q_M)^2$ times, so that the magnitude of the number of the real number multiplication and addition of the ML algorithm is $O(MN(Q_1Q_2 \ldots Q_M)^2$, in which, $O(\cdot)$ represents the magnitude. Therefore, the ML algorithm is complex to implement, especially when the number of the antennas of the transmitting end and the receiving end is large. However, the complexity of the technical solutions of the present invention is merely relevant to the number M of the transmitting antennas and the number N of the receiving antennas. The algorithm in the technical solutions of the present invention mainly focuses on the steps of correcting a channel matrix, that is, the step of correcting a channel matrix through an LR algorithm. The magnitude of the number of the real number multiplication and addition of the step is $O(KM^3)$, in which, K is in the range of $10 \sim 10^2$. Compared with the ML algorithm in the prior art, the technical solutions of the present invention are easier to implement.

Persons of ordinary skill in the art may understand that all or part of the steps of the method according to the embodiments of the present invention may be implemented by a program instructing relevant hardware. The program may be stored in a computer readable storage medium, such as a Read Only Memory (ROM), a Random Access Memory (RAM), a magnetic disk or an optical disk.

The above descriptions are merely specific embodiments of the present invention, but are not intended to limit the protection scope of the present invention. Any modification or replacement that can be easily thought of by persons skilled in the art should fall within the protection scope of the present invention. Therefore, the protection scope of the present invention is subject to the appended claims.

What is claimed is:

1. A signal detecting method for a multi-codeword multi-input multi-output (MIMO) system, comprising:
   converting a received complex number signal into a real number signal;
   performing channel estimation to obtain a channel matrix;
   generating an equivalent channel matrix according to the channel matrix;
   generating a transformation matrix according to the generated equivalent channel matrix;
   correcting the equivalent channel matrix by using the transformation matrix, so as to obtain an equivalent corrected matrix;
   generating an equivalent detecting signal according to the equivalent corrected matrix and the real number signal obtained through conversion;
   quantizing the equivalent detecting signal to obtain an equivalent quantized detecting signal; and
   generating a signal transmitted from a transmitting end according to the equivalent quantized detecting signal;
   wherein the generating the equivalent channel matrix according to the channel matrix comprises:
   transforming a channel model function Y=HX+n obtained after the received complex number signal is converted into the real number signal, so as to obtain a channel model function Y=H(As+b)+n after transformation,
   wherein, A is a 2M×2M diagonal matrix whose diagonal element is diag(A)=[$a_1, a_2, \ldots, a_M, a_1, a_2, \ldots, a_M$], and when a signal $x_m$ transmitted on an mth antenna of the transmitting end is modulated using a pth modulation manner $2^{Q_p}$-QAM, $a_m=\alpha_p$, and $$\alpha_p = \sqrt{\frac{6}{2^{Q_p}-1}},$$

b is a 2M×1 matrix, $b=[b_1, b_2, \ldots, b_M, b_1, b_2, \ldots, b_m]^T$, and when the signal $x_m$ transmitted on the mth antenna of the transmitting end is modulated using the pth modulation manner $2^{Q_p}$-QAM, $b=\beta_p$, and $$\beta_p = -\frac{\alpha_p}{2}\left(2^{\frac{Q_p}{2}}-1\right),$$

s is a 2M×1 matrix consisting of integer elements, $s=[s_1, s_2, \ldots, s_M, s_1, s_2, \ldots, s_M]^T$, and when the signal $x_m$ transmitted on the mth antenna of the transmitting end is modulated using the pth modulation manner $2^{Q_p}$-QAM, $$s_m \in \{0, 1, \ldots, 2^{\frac{Q_p}{2}}-1\};$$

and extracting A from the channel model matrix Y=H(As+b)+n obtained after transformation, so as to obtain an equivalent channel matrix $H_0$=HA.

2. The signal detecting method for a multi-codeword MIMO system according to claim 1, wherein the correcting the equivalent channel matrix by using the transformation matrix, so as to obtain the equivalent corrected matrix comprises: correcting the equivalent channel matrix $H_0$ by using the transformation matrix T according to a formula $\overline{H}=H_0T$, so as to obtain an equivalent corrected matrix $\overline{H}$.

3. The signal detecting method for a multi-codeword MIMO system according to claim 1, wherein the generating the equivalent detecting signal according to the equivalent corrected matrix and the real number signal obtained through conversion comprises:

generating a channel equalization matrix according to the equivalent corrected matrix, wherein the product of the channel equalization matrix and the equivalent corrected matrix is a unit matrix; and generating an equivalent detecting signal according to the channel equalization matrix and the real number signal obtained through conversion.

4. The signal detecting method for a multi-codeword MIMO system according to claim 3, wherein the generating the channel equalization matrix according to the equivalent corrected matrix, wherein the product of the channel equalization matrix and the equivalent corrected matrix is a unit matrix comprises:

generating a channel equalization matrix $\overline{G}$ according to the equivalent corrected matrix $\overline{H}$ and a formula $\overline{G}=(\overline{H}^T\overline{H})^{-1}\overline{H}^T$, wherein $\overline{G}\overline{H}=I$ and I is a unit matrix.

5. The signal detecting method for a multi-codeword MIMO system according to claim 3, wherein before the generating the channel equalization matrix according to the equivalent corrected matrix, the signal detecting method further comprises: obtaining a noise power signal; and the generating the channel equalization matrix according to the equivalent corrected matrix is:

generating a channel equalization matrix according to the equivalent corrected matrix and the noise power signal.

6. The signal detecting method for a multi-codeword MIMO system according to claim 5, wherein the generating the channel equalization matrix according to the equivalent corrected matrix and the noise power signal comprises:

generating a channel equalization matrix $\overline{G}$ according to the equivalent corrected matrix $\overline{H}$, the noise power signal $\sigma_n^2$ and a formula $$\overline{G} = \left(\overline{H}^T\overline{H} + \frac{\sigma_n^2}{\sigma_s^2}I_{2N\times 2N}\right)^{-1}\overline{H}^T,$$

wherein $\sigma_x^2$ is the power of the real number signal Y obtained through conversion.

7. A signal detecting device for a multi-codeword multi-input multi-output (MIMO) system, comprising:

a signal converting unit, configured to convert a received complex number signal into a real number signal;

a channel estimating unit, configured to perform channel estimation to obtain a channel matrix;

a channel matrix correcting unit, configured to correct the channel matrix obtained by the channel estimating unit to obtain an equivalent corrected matrix;

an equivalent detecting signal generating unit, configured to generate an equivalent detecting signal according to the equivalent corrected matrix obtained by the channel matrix correcting unit and the real number signal generated by the signal converting unit;

an equivalent detecting signal quantizing unit, configured to quantize the equivalent detecting signal generated by the equivalent detecting signal generating unit to obtain an equivalent quantized detecting signal; and a signal-transmitted-from-transmitting-end generating unit, configured to generate a signal transmitted from a transmitting end according to the equivalent quantized detecting signal obtained by the equivalent detecting signal quantizing unit;

wherein the channel matrix correcting unit comprises:

an equivalent channel matrix generating unit, configured to:

transform a channel model function Y=HX+n obtained after the received complex number signal is converted into the real number signal, so as to obtain a channel model function Y=H(As+b)+n after transformation, wherein A is a 2M×2M diagonal matrix whose diagonal element is diag(A)=$[a_1, a_2, \ldots, a_M, a_1, a_2, \ldots, a_M]$, and when a signal $x_m$ transmitted on an mth antenna of the transmitting end is modulated using a pth modulation manner $2^{Q_p}$-QAM, $a_m=\alpha_p$, and $$\alpha_p = \sqrt{\frac{6}{2^{Q_p}-1}},$$

b is a 2M×1 matrix, $b=[b_1, b_2, \ldots, b_M, b_1, b_2, \ldots, b_M]^T$, and when the signal $x_m$ transmitted on the mth antenna of the transmitting end is modulated using the pth modulation manner $2^{Q_p}$-QAM, $b_m=\beta_q$, and $$\beta_p = -\frac{\alpha_p}{2}\left(2^{\frac{Q_p}{2}} - 1\right),$$

s is a 2M×1 matrix consisting of integer elements, $s=[s_1, s_2, \ldots, s_M, s_1, s_2, \ldots, s_M]^T$, and when the signal $x_m$ transmitted on the mth antenna of the transmitting end is modulated using the pth modulation manner $2^{Q_p}$-QAM, $$s_m \in \left\{0, 1, \ldots, 2^{\frac{Q_p}{2}} - 1\right\};$$

and extract A from the channel model matrix Y=H(As+b)+n obtained after transformation, so as to obtain an equivalent channel matrix $H_0$=HA;

a transformation matrix generating unit, configured to generate a transformation matrix according to the equivalent channel matrix obtained by the equivalent channel matrix generating unit; and a correcting unit, configured to correct the equivalent channel matrix generated by the equivalent channel matrix generating unit by using the transformation matrix generated by the transformation matrix generating unit, so as to obtain an equivalent corrected matrix.

8. The signal detecting device for a multi-codeword MIMO system according to claim 7, wherein the equivalent detecting signal generating unit comprises:

a channel equalization matrix generating unit, configured to generate a channel equalization matrix according to the equivalent corrected matrix obtained by the channel matrix correcting unit, wherein the product of the channel equalization matrix and the equivalent corrected matrix is a unit matrix; and a generating unit, configured to generate an equivalent detecting signal according to the channel equalization matrix generated by the channel equalization matrix generating unit and the real number signal obtained by the signal converting unit.

9. The signal detecting device for a multi-codeword MIMO system according to claim 8, further comprising:

a noise power signal obtaining unit, configured to obtain a noise power signal; wherein the channel equalization matrix generating unit is a second channel equalization matrix generating unit, configured to generate a channel equalization matrix according to the equivalent corrected matrix obtained by the channel matrix correcting unit and the noise power signal obtained by the noise power signal obtaining unit.

* * * * *

UNITED STATES PATENT AND TRADEMARK OFFICE
CERTIFICATE OF CORRECTION

PATENT NO. : 8,300,677 B2  Page 1 of 1
APPLICATION NO. : 12/981878
DATED : October 30, 2012
INVENTOR(S) : Hua et al.

It is certified that error appears in the above-identified patent and that said Letters Patent is hereby corrected as shown below:

On the Title Page, insert -- Item [30] (Foreign Application Priority Data), Chinese Patent Application No. 2008 1 0134429.4, filed July 23, 2008 --.

In the Claims

Column 11, Line 13, in Claim 1, delete "$2^{Qp}$-QAM, b=$\beta_p$," and insert -- $2^{Qp}$-QAM, $b_m=\beta_p$, --, therefor.

Column 12, Line 64, in Claim 7, delete "b=[$b_1$, $b_2$,..., $b_M$, $b_2$,...$b_M$]$^T$," and insert -- b=[$b_1$, $b_2$,..., $b_M$, $b_2$,...,$b_M$]$^T$, --, therefor.

Column 12, Line 67, in Claim 7, delete "$2^{Qp}$-QAM, $b_m=\beta_q$," and insert -- $2^{Qp}$-QAM, $b_m=\beta_p$, --, therefor.

Signed and Sealed this
Twenty-ninth Day of July, 2014

Michelle K. Lee
*Deputy Director of the United States Patent and Trademark Office*